(12) United States Patent
Walker

(10) Patent No.: US 7,107,051 B1
(45) Date of Patent: Sep. 12, 2006

(54) TECHNIQUE TO ESTABLISH WIRELESS SESSION KEYS SUITABLE FOR ROAMING

(75) Inventor: Jesse R. Walker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 776 days.

(21) Appl. No.: 09/675,262

(22) Filed: Sep. 28, 2000

(51) Int. Cl.
- H04Q 7/20 (2006.01)
- H04B 7/00 (2006.01)
- H04M 1/68 (2006.01)
- H04L 9/00 (2006.01)
- H04K 1/00 (2006.01)

(52) U.S. Cl. .................. 455/432.1; 455/410; 455/411; 455/41.1; 455/41.2; 455/41.3; 380/247; 380/248; 713/168

(58) Field of Classification Search ............. 455/432.1, 455/432.2, 411, 410, 41.1, 41.2, 41.3, 436, 455/418; 380/247, 248; 370/531, 338, 352, 370/401, 331
See application file for complete search history.

(56) References Cited

U.S. PATENT DOCUMENTS

| | | | | |
|---|---|---|---|---|
| 5,455,863 A | * | 10/1995 | Brown et al. ............... | 380/247 |
| 5,475,735 A | * | 12/1995 | Williams et al. ............ | 455/403 |
| 5,510,777 A | * | 4/1996 | Pilc et al. .................. | 340/5.27 |
| 5,689,563 A | * | 11/1997 | Brown et al. ............... | 380/247 |
| 5,778,065 A | * | 7/1998 | Hauser et al. .............. | 713/155 |
| 6,363,365 B1 | * | 3/2002 | Kou .......................... | 705/64 |
| 6,370,380 B1 | * | 4/2002 | Norefors et al. ............ | 455/436 |
| 6,539,227 B1 | * | 3/2003 | Jetzek et al. ................ | 455/442 |
| 6,587,680 B1 | * | 7/2003 | Ala-Laurila et al. ........ | 455/411 |
| 6,615,038 B1 | * | 9/2003 | Moles et al. ................ | 455/418 |
| 6,766,453 B1 | * | 7/2004 | Nessett et al. ............. | 713/171 |
| 6,920,559 B1 | * | 7/2005 | Nessett et al. ............. | 713/168 |

* cited by examiner

Primary Examiner—George Eng
Assistant Examiner—Un C. Cho
(74) Attorney, Agent, or Firm—Blakely, Sokoloff, Taylor & Zafman LLP (57) ABSTRACT

A method and an apparatus for establishing secured roaming among wireless devices are disclosed. In one embodiment, a first access point requests a first ticket from an authentication server and uses that first ticket to establish a first secured session with a wireless station. In response to a second ticket request from the wireless station through the first secured session, the first access point forwards the second ticket request to the authentication server and also relays a resulting second ticket from the authentication server back to the wireless station.

27 Claims, 6 Drawing Sheets

TECHNIQUE TO ESTABLISH WIRELESS SESSION KEYS SUITABLE FOR ROAMING

FIELD OF THE INVENTION

This invention relates to authentication technologies generally and particularly to authentication techniques in a wireless network.

BACKGROUND OF THE INVENTION

A wireless network is a flexible data communication medium implemented as an extension for, or as an alternative to, a wired network. By using radio frequency (RF) technology, wireless networks transmit and receive data over air, minimizing the need and the cost typically associated with wired connections. Moreover, wireless networks offer mobility and flexibility for users. For example, doctors and nurses in hospitals are able to use hand-held devices or notebook computers to access patient information from a server through wireless networks without having to search for a physical jack to plug their devices or computers into.

Figure 1:
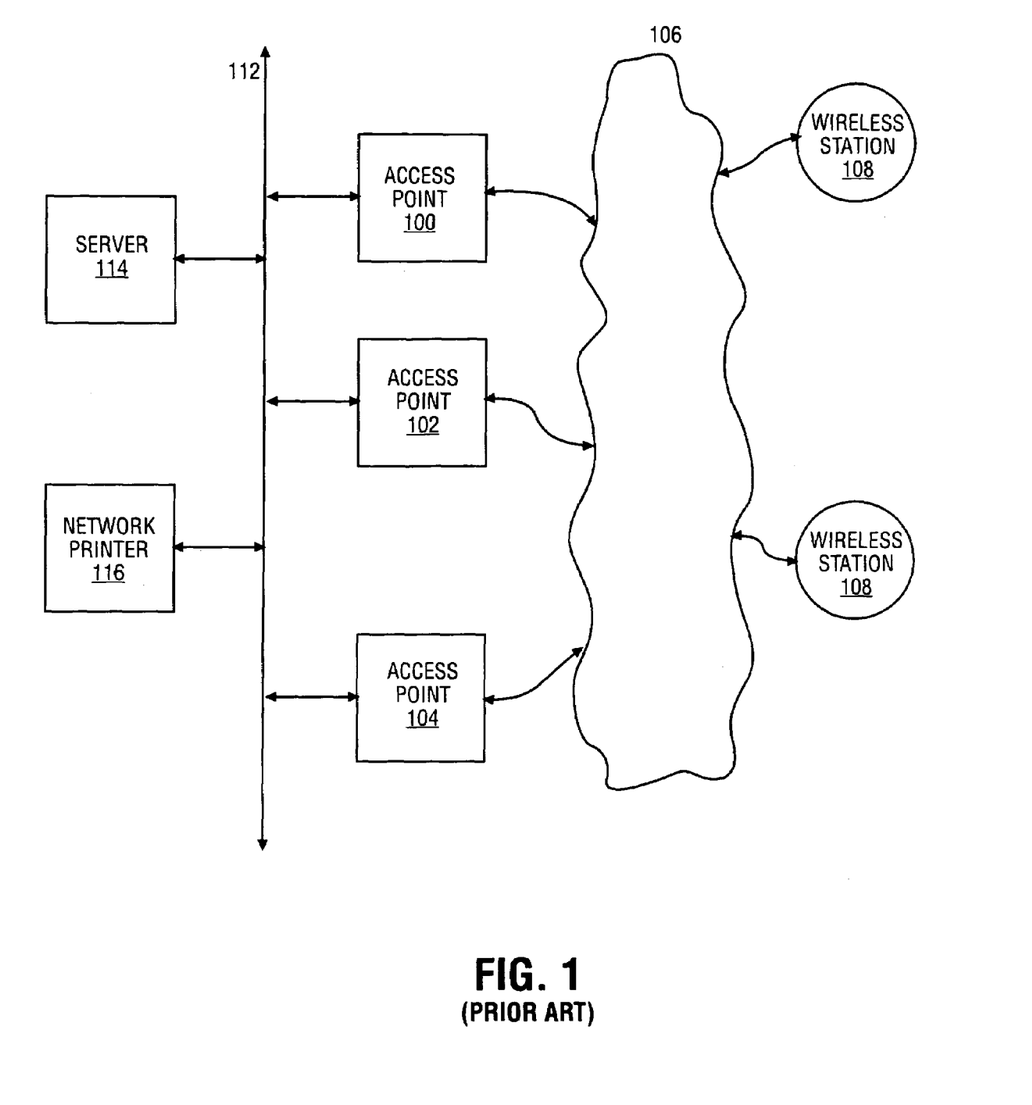
FIG. 1 illustrates a prior art wireless network configuration.

FIG. 1 demonstrates a prior art wireless network configuration. Specifically, the network configuration comprises wireless stations 108 and 110, wireless medium 106 and access points 100, 102 and 104. Wireless stations 108 and 110 communicate with access points 100, 102 and 104 through electromagnetic airwaves 106. Access points 100, 102 and 104 are also connected to wired network 112 and have access to the network resources of wired network 112 such as, server 114, network printer 116 or other devices coupled to wired network 112. It should be noted that wireless stations 108 and 110 are not stationary and do not have to communicate with particular multiple access points. For instance, wireless station 108 may seamlessly move from the coverage area of access point 100 to the coverage area of access point 104 and still maintain its data connections with the access points.

Despite the portability and the convenience that wireless technology offers, there still lacks a comprehensive security scheme to ensure privacy and integrity of the data on wireless networks. For instance, one existing approach is to utilize static keys to encrypt data on a wireless link. Such encrypted data are vulnerable to attack, because the probability of deciphering them is much greater than if the data were encrypted with constantly changing keys. Another approach involves a wireless station sharing a group key with an access point. Thus, when any one device on a wireless network falls into the hands of an attacker, the security of every system in the network is compromised. Yet another approach has every wireless station share one key. As a result, any wireless station is capable of decrypting the traffic of any other wireless.

As has been demonstrated, an improved method and an apparatus are needed to enhance the security of a wireless network.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

A method and an apparatus for establishing secured roaming are disclosed. In the following description, numerous specific details are set forth, such as Kerberos protocol, etc. in order to provide a thorough understanding of the present invention. However, it will be apparent to one of ordinary skill in the art that the invention may be practiced without these particular details. In other instances, well-known elements and theories such as cryptography systems, etc. have not been discussed in special details in order to avoid obscuring the present invention.

In addition, the term, "wireless station", is used throughout the following discussion to refer to any network device that uses some wireless Local Area Network (hereinafter LAN) technology to communicate with a wired network. It can be either an end system or a switching element. Also, a "secured" session refers to information exchanges between two networking devices, where some form of security measures safeguard such exchanges. A "replay attack" describes one form of an attack on a security system. Specifically, a perpetrator who launches such an attack intercepts messages destined for a recipient and replays those intercepted messages back to the recipient.

Unless specifically stated otherwise, the term, "Kerberos protocol", refers to Kerberos Version 5, released on May 5, 1995. It is an authentication protocol that allows entities to authenticate their identities to one another over physically insecure networks and at the same time still prevents eavesdropping and replay attacks. It also incorporates cryptography systems to further provide for data stream integrity (such as detection of modification) and secrecy (such as preventing authorized reading). The Kerberos protocol operates within the Kerberos infrastructure, which comprises, but not limited to, the following:

1) Key Distribution Center (KDC): maintains and controls the distribution of session keys. A KDC is also considered as a special type of an authentication server in the following discussions.
2) Session key: information that enables two systems to establish a secured session. Session keys have limited life span. Thus, if a secured session is not established within a certain period of time, a new session key is needed.
3) Kerberos client: initiates key distribution from the KDC and then uses the distributed session key to initiate a session with a peer.
4) Kerberos server: the peer system with which the Kerberos client wishes to establish a secured session.
5) Ticket: a Kerberos data structure that grants access of the Kerberos client to the Kerberos server.
6) Authenticator: a Kerberos data structure that Kerberos client uses to authenticate itself to a Kerberos server and also to challenge the Kerberos server to authenticate itself to the Kerberos client.

7) Response: a Kerberos data structure that the Kerberos server uses to authenticate itself to the Kerberos client.

Figure 2:
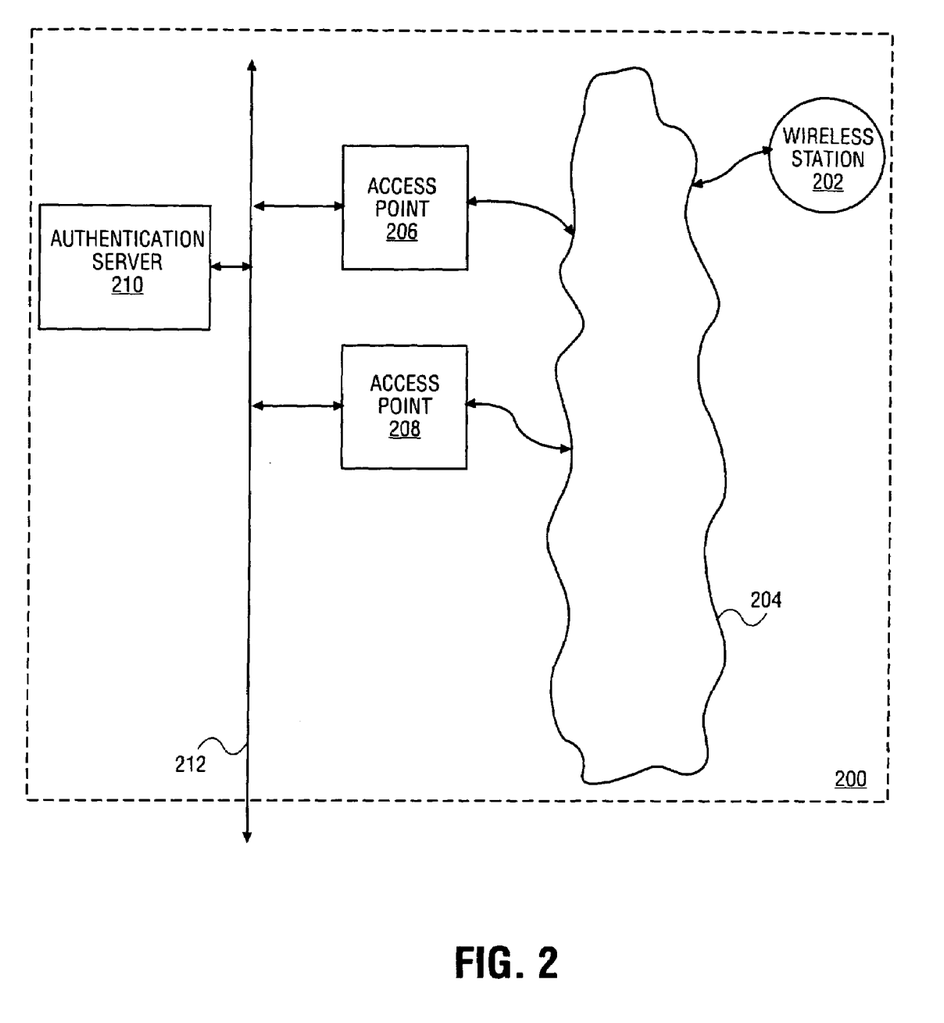
FIG. 2 illustrates one embodiment of the present invention, a secured wireless roaming system.

FIG. 2 illustrates one embodiment of the present invention or secured wireless roaming system (hereinafter SWRS) 200. SWRS 200 comprises one or more specially configured wireless stations, such as wireless station 202, at least two specially configured access points, such as access points 206 and 208 and authentication server 210. Access points 206 and 208 are coupled to authentication server 210 via wired network 212 and are further coupled to wireless station 202 via wireless network 204. Authentication server 212 is responsible for maintaining and providing security information and safeguarding the integrity of wired network 212 and wireless network 204. The interactions among access points 206 and 208, wireless station 202 and authentication server 210 for creating a secured roaming environment will be discussed with examples in the subsequent section that details the operations of SWRS 200.

Figure 3A:
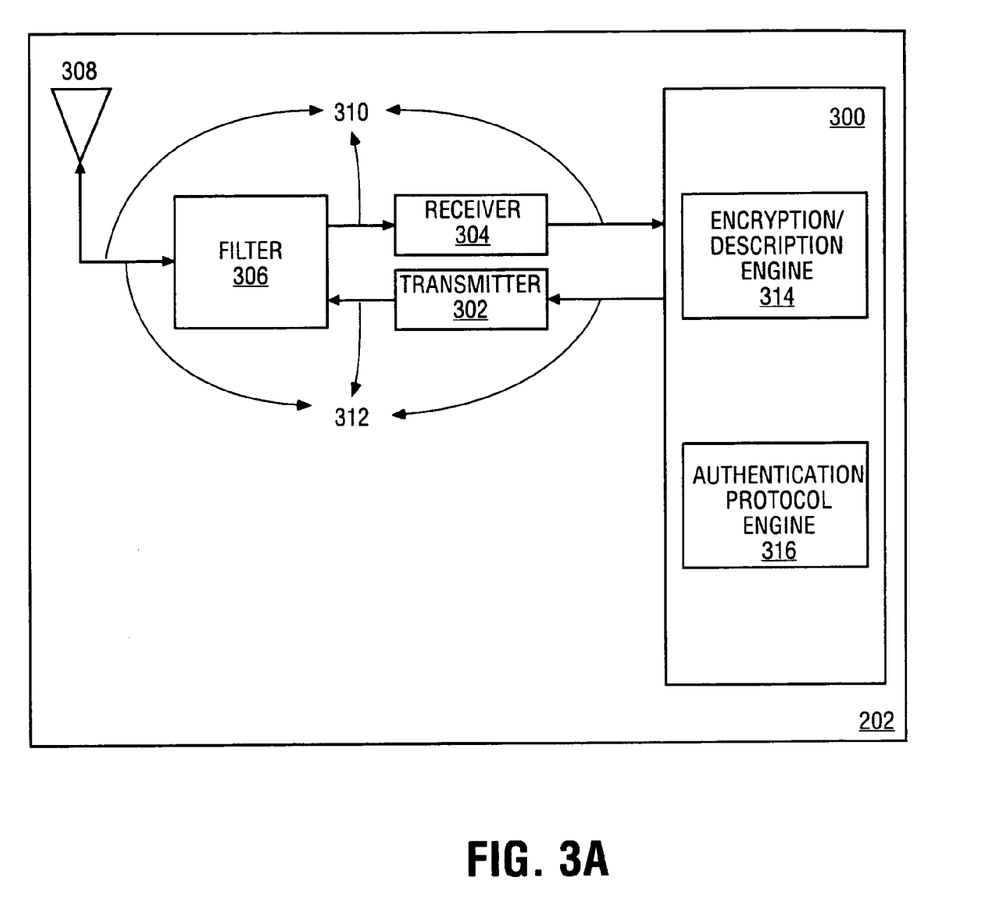
FIG. 3(a) illustrates a block diagram of one embodiment of a wireless station in accordance with the present invention.

FIG. 3(a) illustrates a block diagram of one embodiment of wireless station 202. Wireless station 202 comprises control unit 300, transmitter 302, receiver 304, filter 306 and antenna 308. Control unit 300 is mainly responsible for, but not limited to, preparing data for transmission and consuming received data. One embodiment of control unit 300 includes two functional blocks: encryption/decryption engine 314 and authentication protocol engine 316. An alternative embodiment of control unit 300 may also incorporate a frequency channel selector to dynamically choose an appropriate frequency channel for wireless station 202. Encryption/decryption engine 314 encrypts data that wireless station 202 transmits and decrypts data that wireless station 202 receives with appropriate keys. Additionally, authentication protocol engine 316 contains procedures for wireless station 202 to adhere to in order to further protect the overall integrity of wireless network 204 and wired network 212. Specific examples of the mentioned authentication procedures will be provided in the subsequent section.

Transmitter 302 and receiver 304 share antenna 308. On receive path 310, filter 306 filters out signals received by antenna 308 that are outside of a predetermined frequency range. Receiver 304 is then responsible for extracting data from the filtered signals and passing the resulting data to control unit 300. On transmit path 312, control unit 300 sends prepared data to transmitter 302. Transmitter 302 modulates the prepared data with a carrier of proper frequency and sends the modulated signal to filter 306. Filter 306 again eliminates spurious signal outside of the desired frequency range before transmitting the final filtered signal through antenna 308.

Figure 3B:
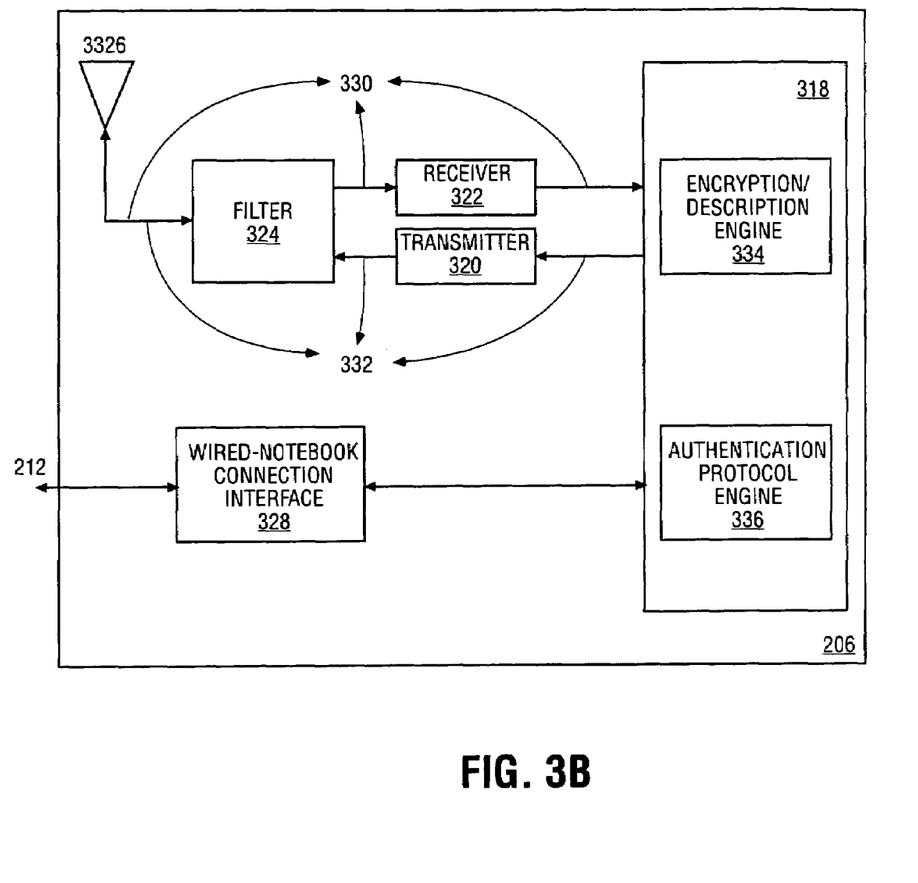
FIG. 3(b) illustrates a block diagram of one embodiment of an access point in accordance with the present invention.

FIG. 3(b) demonstrates a block diagram of one embodiment of access point 206 (or access point 208). Similar to wireless station 202, access point 206 also has control unit 318, transmitter 320, receiver 322, filter 324 and antenna 326. Its control unit 318 has encryption/decryption engine 324 and authentication protocol engine 326 that perform the same functions for access point 206 as encryption/decryption engine 314 and authentication protocol engine 316 do for wireless station 202. In addition, access point 206 has wired-network connection interface 328 to communicate with wired network 212 as shown in FIG. 2.

Operations of a Wireless Station and Access Points in a Secured Wireless Roaming System One specific embodiment of SWRS 200 mainly applies the Kerberos protocol to secure communications among wireless station 202 and access points 206 and 208. In other words, authentication protocol engine 316 (FIG. 3(a)) of wireless station 202 and authentication protocol engine 336 (FIG. 3(b)) of access points 206 and 208 are specially configured to execute authentication procedures and to handle data structures specified by the Kerberos protocol. However, these mentioned authentication protocol engines 316 and 336 also perform tasks that are either absent or distinct from the Kerberos protocol.

Figure 4:
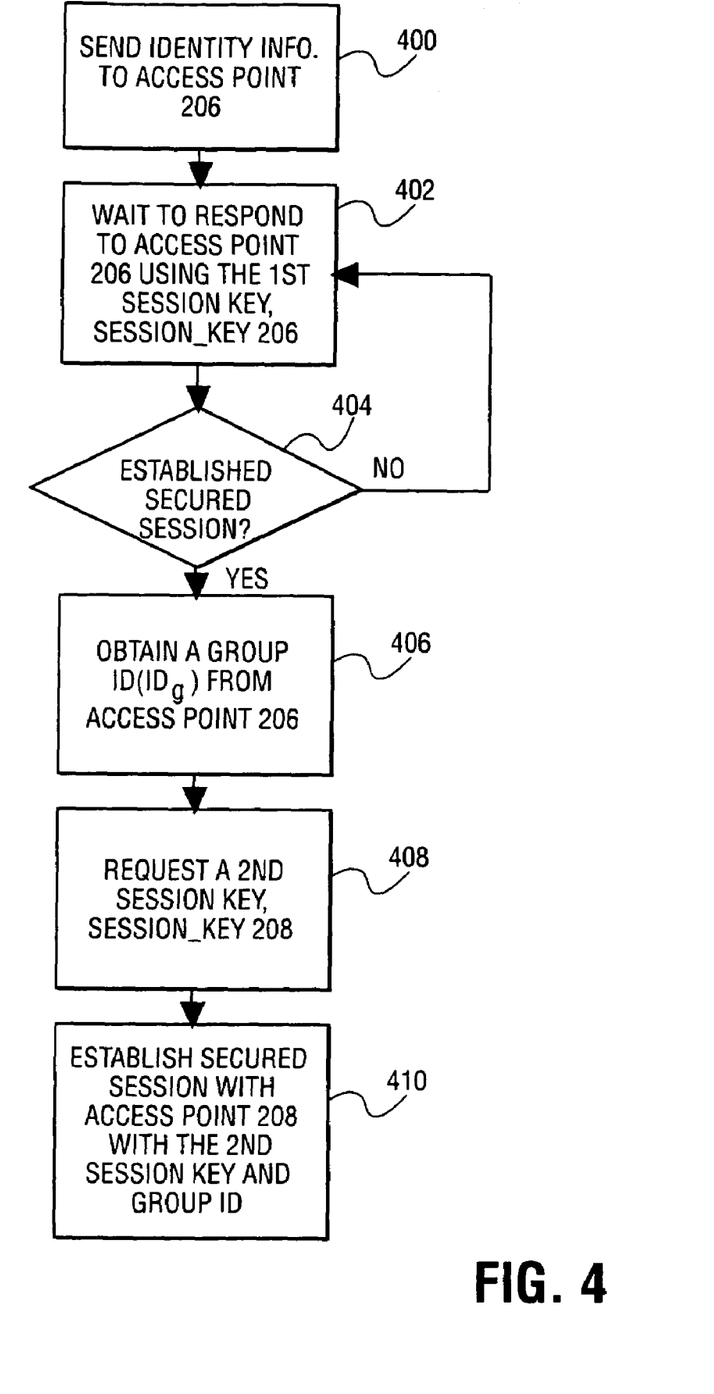
FIG. 4 illustrates a flow chart of one process that one embodiment of a wireless station in accordance with the present invention follows.

FIG. 4 describes a flow chart of one process that one embodiment of wireless station 202 follows. This figure assumes the following: 1) authentication server 210 as shown in FIG. 2 is the KDC; 2) wireless station 202 does not yet have the session key to set up a secured session with access point 206, or session_key$_{206}$; 3) wireless station 202 is currently in the coverage area of access point 206 and will "roam" in the coverage area of access point 208; 4) access points 206 and 208 share one group identification, ID$_g$; and 5) the session key for wireless station 202 to establish a secured session with access point 208 is denoted as session_key$_{208}$.

In conjunction with FIGS. 2 and 3, instead of acting like a Kerberos client as in a typical application of the Kerberos protocol, authentication protocol engine 316 instructs wireless station 202 to behave as a Kerberos server and provides access point 208 with its identity information in block 400. Then authentication protocol engine 316 waits to respond to access point 206's attempt to establish a secured session using the newly obtained session_key$_{206}$ in block 402. A session is considered secured when wireless station 202 and access point 206 complete their mutual authentication within the lifetime of session_key$_{206}$. After authentication protocol engine 316 confirms that a secured session has been established in block 404, wireless station 202 obtains ID$_g$ from access point 206 in block 406. ID$_g$ enables wireless station 202 to access all the access points that share the same ID$_g$, such as access point 208.

However, wireless station 202 cannot proceed to establish a secured session with access point 208 unless it has another valid session key, or session_key$_{208}$. As wireless station 202 moves into the coverage area of access point 208, authentication protocol engine 316 switches wireless station 202's role back to being a Kerberos client and requests for session_key$_{208}$ from authentication server 210 in block 408. It is important to note that in a typical application of the Kerberos protocol, a Kerberos client needs to have the identity information of a peer system prior to initiating a session with such a system. In contrast, one embodiment of wireless station 202 simply uses session_key$_{208}$ and ID$_g$ to initiate a session with access point 208 in block 410.

Figure 5:
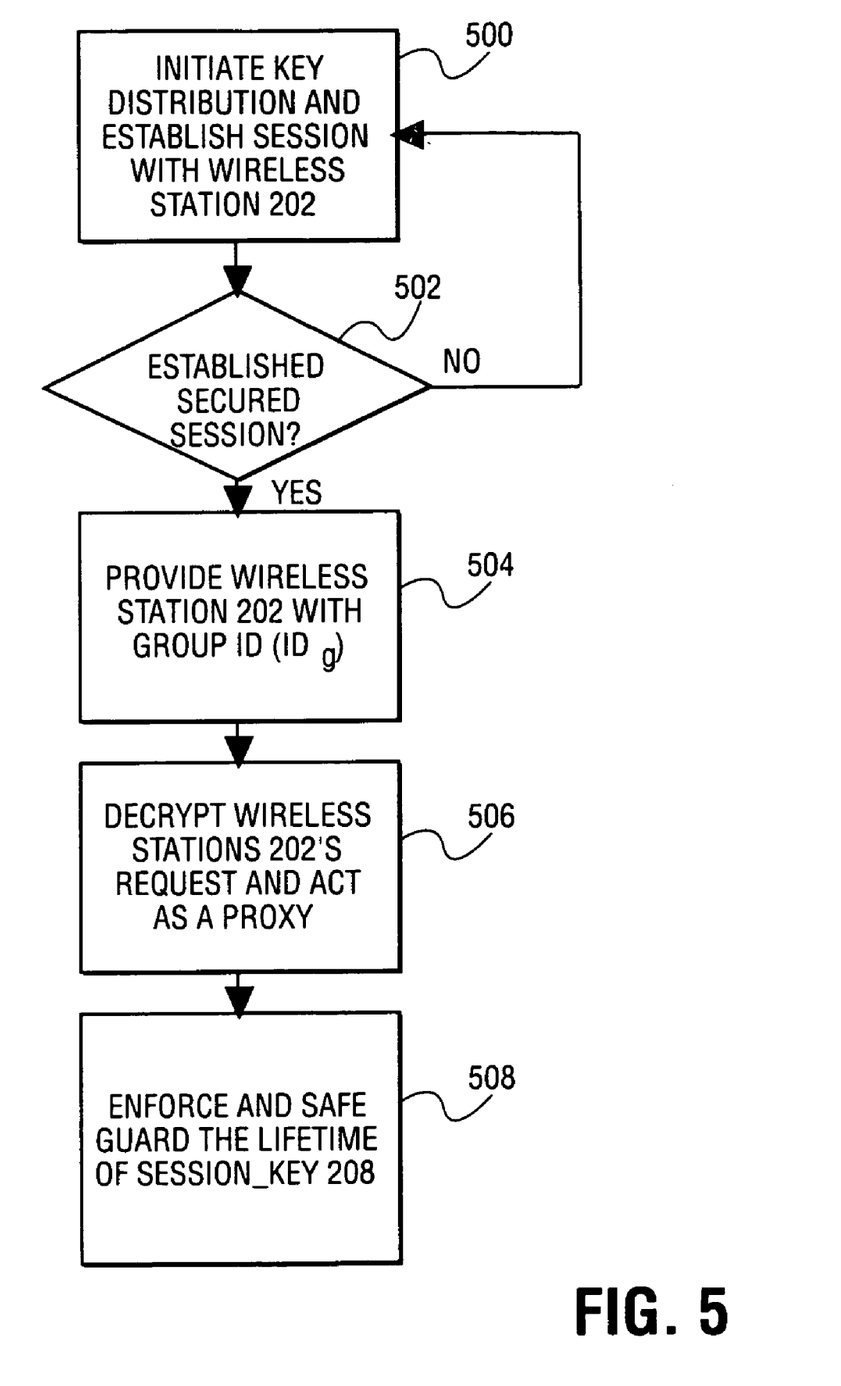
FIG. 5 illustrates a flow chart of one process that one embodiment of an access point in accordance with the present invention follows.

FIG. 5 illustrates a flow chart of one process that one embodiment of access point 206 (FIG. 2) follows. This figure also relies on the same five assumptions described above. In parallel to the discussion for wireless station 202 above, authentication protocol engine 336 instructs access point 206 to behave as a Kerberos client instead of a Kerberos server. Thus, access point 206 initiates session key distribution from authentication server 210 and attempts to establish a secured session with wireless station 202 using session_key$_{206}$ in block 500. After a secured session has been established in block 502, authentication protocol engine 336 provides wireless station 202 with ID$_g$ in block 504.

Authentication protocol engine 336 then dictates access point 206 to serve as a proxy, or a relay agent, for wireless station 202. As a result, when access point 206 receives a session key request message, such as a ticket request message, from wireless station 202, encryption/decryption engine 334 decrypts the message and authentication protocol engine 336 relays the decrypted message to authentication server 210 in block 506. Similarly, authentication protocol engine 336 also relays session_key$_{208}$ from authentication server 210 to wireless station 202 after the session key becomes available. However, before the actual relay occurs, authentication protocol engine 336 appends certain information to session_key$_{208}$ to set the lifetime of the session key in block 508. In one embodiment, authentication protocol engine 336 selects and appends the current time of day, T, and a random number, N, to the session key.

In addition to the block diagrams as shown in FIGS. 2, 3(a) and 3(b) and flow charts as shown in FIGS. 4 and 5, the following tables further demonstrate implementation details of one embodiment of SWRS 200. Phase 1 corresponds to blocks 400, 402 and 404 as illustrated in FIG. 4 and blocks 500, 502 and 504 as illustrated in FIG. 5. Phase 2 corresponds to blocks 408, 506 and 508. At last, phase 3 corresponds to block 410.

| Phase 1: | |
|---|---|
| Actions | Explanations |
| Wireless station 202 → access point 206: ID$_w$ | Wireless station 202 sends its identity information to access point 206. |
| Access point 206 → KDC: ID$_{ap\ 206}$, ID$_w$, N$_{ap\ 206}$ | In addition to the identity information of access point 206 and wireless station 202, access point 206 also creates and sends a randomly generated number, N$_{ap\ 206}$, to KDC. This message that access point 206 sends to KDC is also referred to as the ticket request message. |
| KDC → access point 206: E(K$_w$; K$_{206}$, ID$_{ap\ 206}$, L$_{ap\ 206}$), E(K$_{ap}$; K$_{206}$, N$_{ap\ 206}$, L$_{ap\ 206}$, ID$_w$) Note 1: The notation, E(K, ***), means that *** is encrypted using encryption key K. Note 2: Session key, K$_{206}$, has a lifetime of L$_{ap\ 206}$. | After KDC generates session key, K$_{206}$, KDC encrypts the session key with encryption keys of wireless station 202, K$_w$, and of access point 206, K$_{ap}$, and sends the encrypted messages to access point 206. These messages are also referred to as the ticket granting message. Encryption/decryption engine 334 of access point 206 deciphers part of the ticket granting message using the encryption key, K$_{ap}$, that it already has knowledge of and passes on the decrypted message to authentication protocol engine 336. Authentication protocol engine 336 proceeds to verify the value of N$_{ap\ 206}$ to ensure that the integrity of the information from KDC has not been compromised. |
| Access point 206 → wireless station 202: E(K$_w$; K$_{206}$, ID$_{ap\ 206}$, L$_{ap\ 206}$), E(K$_{206}$; ID$_{ap\ 206}$, T$_1$) Note: T$_1$ represents the time that access point 206 issues this challenge message. | Authentication protocol engine 336 of access point 206, as has been discussed before, has access point 206 act as a Kerberos client and sends its targeted Kerberos server, wireless station 202, a challenge message. A challenge message includes a ticket and an authenticator. In this case, the ticket is E(K$_w$; K$_{206}$, ID$_{ap\ 206}$, L$_{ap\ 206}$), and the authenticator is E(K$_{206}$; ID$_{ap\ 206}$, T$_1$). |
| Wireless station 202 → access point 206: E(K$_{206}$; T$_1$) | Wireless station 202 has from time T$_1$ to T$_1$ + L$_{ap\ 206}$ to authenticate itself to access point 206 by sending this response message, E(K$_{206}$; T$_1$), to access point 206. |
| Access point 206 → wireless station 202: E(K$_{206}$; ID$_g$) | Access point 206 shares the group identity information with wireless station 202. |

| Phase 2 | |
|---|---|
| Actions | Explanations |
| Wireless station 202 → access point 206: E(K$_{206}$; ID$_w$, ID$_g$, N$_w$) Note: N$_w$ is a random number that wireless station 202 generates. | As has been mentioned in prior sections, wireless station 202 has changed back to being a Kerberos client. It generates and sends a ticket request message to access point 206 secured by session key, K$_{206}$. |
| Access point 206 → KDC: ID$_w$, ID$_g$, N$_w$ | Access point 206 serves as a proxy for wireless station 202. |
| KDC → access point 206: E(K$_g$; K$_{208}$, ID$_w$, L$_{ap\ 208}$), E(K$_w$; K$_{208}$, N$_w$, L$_{ap\ 208}$, ID$_g$) Note: KDC creates a second session key, K$_{208}$, to allow wireless station 202 to establish a secured session with access point 208. It is important to emphasize that wireless station 202 relies on ID$_g$ and does not need to depend on the identity information of access point 208 to set up the secured session. As a result, wireless station 202 avoids executing the same authentication sequences with access point 208 as it does with access point 206 and shortens the time required to establish the secured session with access point 208. | KDC responds to the ticket request message with a ticket granting message. |
| Access point 206 → KDC: E(K$_{206}$; E(K$_g$; K$_{208}$, ID$_w$, L$_{ap\ 208}$), E(K$_w$; K$_{208}$, N$_w$, L$_{ap\ 208}$, ID$_g$), T$_2$, E(K$_g$; N, ID$_w$, T$_2$)) Note: Wireless station 202 may execute the phase 2 protocol at any moment during the time from T$_1$ to T$_1$ + L$_{206}$. | Access point 206 selects a time to be T$_2$, selects a random number N and appends T$_2$ and E(K$_g$; N, ID$_w$, T$_2$) to the ticket granting message in order to enforce the lifetime of session_key$_{208}$. This prevents wireless station 202 from specifying an unauthorized value for T$_2$. |

| Phase 3 | |
|---|---|
| Actions | Explanations |
| Wireless station 202 → access point 208: ID$_w$, E(K$_w$; K$_{208}$, N$_w$, L$_{208}$, ID$_g$), E(K$_{208}$; ID$_w$, T$_2$), E(K$_g$; N, ID$_w$, T$_2$) | With the information that access point 208 receives, it can verify the identity of wireless station 202 and determine the validity period of session_key$_{208}$ (i.e. from T$_2$ to T$_2$ + L$_{208}$). |
| Access point 208 → wireless station 202: E(K$_{208}$; ID$_g$), E(K$_{208}$; N', ID$_w$) | The encrypted payload, E(K$_{208}$; N', ID$_w$), protects wired network 212 against replay attacks. In other words, because access point 208 keeps generating new N's, wireless station 202 could rely on the varying N's to detect attempts to replay messages from access point 208. |
| Wireless station 202 → access point 208: E(K$_{208}$; N') | Wireless station 202 proves that it indeed has session_key$_{208}$. |

Thus, a method and an apparatus for establishing secured roaming have been disclosed. Although the secured wireless roaming system has been described particularly with reference to the figures, one with ordinary skill in the art may further divide or combine the functionality of its functional blocks. For example, an ordinarily skilled artisan may combine encryption/decryption engine 314 and authentication protocol engine 316 into one integrated component. Finally, despite the detailed discussion on Kerberos protocol, one of ordinary skill in the art could employ other authentication protocols without departing from the spirit and scope of the present invention.

The invention claimed is:

1. A method for establishing secured roaming among a wireless station, a first and a second access points, comprising:
the first access point requesting a first ticket including a first session key from an authentication server at a first time and using the first ticket to establish a first secured session with the first session key between the first access point and the wireless station; and
in response to a second ticket request from the wireless station through the first secured session when the wireless station attempts to communicate with the second access point at a second time after the first time, the first access point forwarding the second ticket request to the authentication server and relaying through the first secured session a resulting second ticket including a second session key with a predefined lifetime starting from after the second time, from the authentication server to the wireless station, the second ticket being different than the first ticket, the second key being different than the first key, wherein the second ticket is used to establish a second secured session with the second session key between the wireless station and the second access point.

2. The method according to claim 1, the method further comprises:
applying the second ticket and a group identity shared by the first and the second access points to establish a second secured session between the wireless station and the second access point, the group identity identifying that the first and second access points belong to the same group, and wherein the wireless station can only access another access point within the same group identified by the group identity using the second ticket.

3. The method according to claim 1, the method further comprises:
the authentication server dynamically generating a first and a second session keys to include in the first and the second tickets, respectively; and
the authentication server encrypting the first and the second tickets with a first and a second encryption keys.

4. The method according to claim 3, the first and the second session keys have limited lifetime.

5. The method according to claim 3, the method further comprises:
the first access point appending application specific information to the second ticket to formulate a combined message; and
the first access point encrypting the combined message with the first session key.

6. The method according to claim 5, the application specific information further comprises the first access point's selected time and random number.

7. The method of claim 3, wherein the first access point requesting a first ticket from an authentication server comprises:
the wireless station providing an identification (ID) of the wireless station to the first access point;
the first access point obtaining the first ticket from the authentication server; and
the first access point establishing the first secured session using the newly obtained first ticket.

8. The method of claim 7, further comprising the wireless station obtaining a group ID from the first access point via the first secured session, the group ID being shared with the first and second access points and identifying that the first and second access point belong to the same group, wherein the wireless station can only access another access point within the same group.

9. The method of claim 8, wherein the second secured session is established based on the second session key and the group ID.

10. The method of claim 1, wherein the second ticket is only valid for the second secured session between the wireless station and the second access point.

11. The method of claim 10, wherein the second ticket is only valid for the second secured session for a predetermined period of time.

12. An access point in a secured wireless roaming system, comprising:
an antenna;
a filter coupled to the antenna;
a receiver and a transmitter coupled to the filter; and
a control unit coupled to the receiver and the transmitter and coupled to a wired-network connection interface, wherein the control unit further comprises an authentication protocol engine that
requests a first ticket including a first session key from an authentication server at a first time and uses the first ticket to establish a first secured session with the first session key with a wireless station; and
in response to a second ticket request from the wireless station through the first secured session when the wireless station attempts to communicate with a second access point at a second time after the first time, forwards the second ticket request to the authentication server and relays through the first secured session a resulting second ticket including a second session key with a predefined lifetime starting from after the second time, from the authentication server to the wireless station, the second ticket being different than the first ticket, the second key being different than the first key, wherein the second ticket is used to establish a second secured session with the second session key between the wireless station and the second access point.

13. The access point according to claim 12, the control unit further comprises:
an encryption/decryption engine to decrypt the second ticket request before the authentication protocol engine forwards the second ticket request.

14. The access point according to claim 13, further comprises:
the authentication protocol engine to append application specific information to the second ticket to formulate a combined message; and
the encryption/decryption engine to encrypt the combined message with the first session key.

15. The access point according to claim 14, the application specific information further comprises the access point's selected time and random number.

16. The access point according to claim 12, wherein the authentication server further:
dynamically generates a first and a second session keys to include in the first and the second tickets, respectively; and
encrypts the first and the second tickets with a first and a second encryption keys.

17. The access point according to claim 16, the first and the second session keys have limited lifetime.

18. A wireless station in a secured wireless roaming system having a first access point and a second access point, comprising:
   an antenna;
   a filter coupled to the antenna;
   a receiver and a transmitter coupled to the filter; and
   a control unit coupled to the receiver and the transmitter, wherein the control unit further comprises an authentication protocol engine that
      requests at a second time, when the wireless station attempts to communicate with the second access point, a second ticket including a second session key with a predefined lifetime starting from after the second time from an authentication server via a first secured session with a first session key established with a first access point using a first ticket at a first time before the second time, the second ticket being different than the first ticket, and the first session key being different than the second session key; and
      establishes a second secure session with the second session key with a second access point using the second ticket received via the first secured session.

19. The wireless station according to claim 18, comprising:
   the authentication protocol engine to apply the second ticket and a group identity shared by the first and the second access points to establish a second secured session with the second access point, the group identity identifying that the first and second access points belong to the same group, and wherein the wireless station can only access another access point within the same group identified by the group identity using the second ticket.

20. A secured wireless roaming system, comprising:
   a wired medium;
   a wireless medium;
   an authentication server coupled to the wired medium;
   a wireless station coupled to the wireless medium; and
   an access point coupled to the wireless medium and the wired medium, wherein the access point comprises:
      a first control unit, comprising a first authentication protocol engine to request a first ticket including a first session key from the authentication server at a first time and use the first ticket to establish a first secured session with the first session key with the wireless station; and
      in response to a second ticket request from the wireless station through the first secured session when the wireless station attempts to communicate with a second access point coupled to the wired and wireless mediums at a second time after the first time, to forward the second ticket request to the authentication server and relays through the first secured session a resulting second ticket including a second session key with a predefined lifetime starting from after the second time, from the authentication server to the wireless station, the second ticket being different than the first ticket, the second session key being different than the first session key, and wherein the second ticket is used by the wireless station to establish a second secured session with the second session key with the second access point.

21. The secured wireless roaming system according to claim 20, wherein the wireless station further comprises:
   a second authentication protocol engine to apply the second ticket and a group identity shared by the first and a second access points to establish a second secured session with the second access point, the group identity identifying that the first and second access points belong to the same group, and wherein the wireless station can only access another access point within the same group identified by the group identity using the second ticket.

22. The secured wireless roaming system according to claim 20, the first control unit further comprises:
   an encryption/decryption engine to decrypt the second ticket request before the authentication protocol engine forwards the second ticket request.

23. The secured wireless roaming system according to claim 22, the first and the second session keys have limited lifetime.

24. The secured wireless roaming system according to claim 22, further comprising:
   the first authentication protocol engine to append application specific information to the second ticket to formulate a combined message; and
   the first encryption/decryption engine to encrypt the combined message with the first session key.

25. The access point according to claim 24, the application specific information further comprises the access point's selected time and random number.

26. The secured wireless roaming system according to claim 20, wherein the authentication server further:
   dynamically generates a first and a second session keys to include in the first and the second tickets, respectively; and
   encrypts the first and the second tickets with a first and a second encryption keys.

27. A computer-readable medium having executable code to cause a machine to perform a method for establishing secured roaming among a wireless station, a first and a second access points, the method comprising:
   the first access point requesting a first ticket including a first session key from an authentication server at a first time and using the first ticket to establish a first secured session with the first session key with the wireless station; and
   in response to a second ticket request from the wireless station through the first secured session when the wireless station attempts to communicate with the second access point at a second time after the first time, the first access point forwarding the second ticket request to the authentication server and relaying through the first secured session a resulting second ticket including a second session key with a predefined lifetime starting from after the second time, from the authentication server to the wireless station, the second ticket being different than the first ticket, the second key being different than the first key, wherein the second ticket is used to establish a second secured session with the second session key between the wireless station and the second access point.

* * * * *